(12) United States Patent
Elazzami et al.

(10) Patent No.: US 11,853,593 B2
(45) Date of Patent: Dec. 26, 2023

(54) SHARED MEMORY PROTECTION METHOD FOR SECURING MMIO COMMANDS

(71) Applicant: Dell Products L.P., Round Rock, TX (US)

(72) Inventors: Bassem Elazzami, Austin, TX (US); Adolfo Sandor Montero, Pflugerville, TX (US); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 17/722,817

(22) Filed: Apr. 18, 2022

(65) Prior Publication Data
US 2023/0333769 A1    Oct. 19, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ........ G06F 3/06; G06F 3/0679; G06F 3/0655; G06F 3/0604
See application file for complete search history.

(56) References Cited

U.S. PATENT DOCUMENTS

| | | | | |
|---|---|---|---|---|
| 2013/0086303 A1* | 4/2013 | Ludwig | ................... | G06F 16/13 |
| | | | | 711/E12.008 |
| 2017/0235940 A1* | 8/2017 | McEwen | ................. | G06F 16/00 |
| | | | | 726/19 |
| 2018/0232392 A1* | 8/2018 | Mohamed | ........... | G06F 21/6218 |
| 2020/0201552 A1* | 6/2020 | Matsubara | ............ | G06F 3/0656 |
| 2021/0056029 A1* | 2/2021 | Sharovar | ............. | G06F 12/0893 |

FOREIGN PATENT DOCUMENTS

WO    WO-2021140506 A1 *  7/2021  ......... G07C 9/00309

OTHER PUBLICATIONS

L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008.*
M. D. Grammatikakis et al., "Security Effectiveness and a Hardware Firewall for MPSoCs," 2014 IEEE Intl Conf on High Performance Computing and Communications, 2014 IEEE 6th Intl Symp on Cyberspace Safety and Security, 2014 IEEE 11th Intl Conf on Embedded Software and Syst , Paris, France, 2014, pp. 1032-1039.*
Yan Liu, "Design and implement a safe method for isolating memory based on Xen cloud environment," 2016 7th IEEE International Conference on Software Engineering and Service Science (ICSESS), Beijing, China, 2016, pp. 804-807.*

* cited by examiner

*Primary Examiner* — Pierre Michel Bataille
(74) *Attorney, Agent, or Firm* — Womble Bond Dickinson (US) LLP

(57) ABSTRACT

Methods and systems for managing communications is disclosed. A host device and a management controller may communicate via memory mapped communications using shared memory. To improve the security of the memory mapped communications, access requests for shared memory may be monitored. Access controls for the shared memory may be put in place to reduce the likelihood of data being made unavailable before it is processed. The access controls may be lifted when the data stored in shared memory has been read by to complete the memory mapped communications.

20 Claims, 10 Drawing Sheets

SHARED MEMORY PROTECTION METHOD FOR SECURING MMIO COMMANDS

FIELD OF THE INVENTION

Embodiments disclosed herein relate generally to communication management. More particularly, embodiments disclosed herein relate to systems and methods to manage memory mapped communications.

BACKGROUND

Computing devices may store data and used stored data. For example, computing devices may utilize data when providing computer implemented services. If computing devices are unable to access data, the computing devices may be unable to provide some, or all, of the computer implemented services that they are able to provide with access to data.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
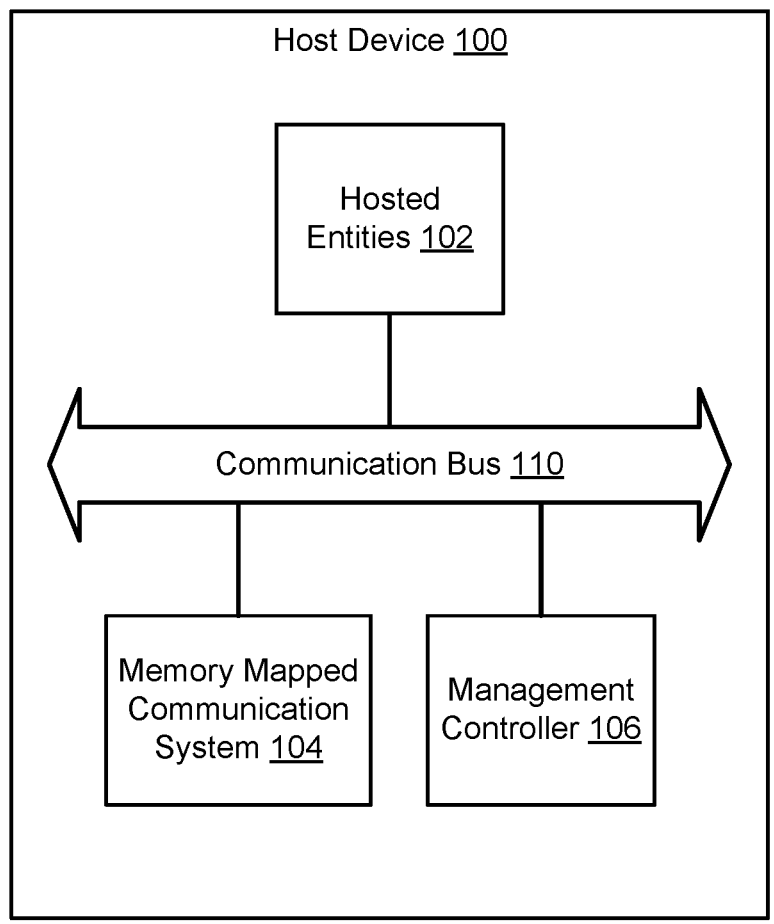
FIG. 1 shows a block diagram illustrating a system in accordance with an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for managing the operation of host devices. A host device may provide computer implemented services by hosting applications. The operation of the host device may be managed by a management controller which may also be hosted by the host device.

The ability of the applications to provide computer implemented service may be limited based on the operation of the host device. To cooperatively manage the operation of the host device, the applications may communicate with the host device via memory mapped communications. A memory mapped communication may be a communication protocol where two entities communicate with one another by storing data in shared memory locations. To send a communication, one of the entities may store data in the shared memory location and the other entity may read the shared memory location.

To manage the memory mapped communications, the system may automatically apply access controls to the shared memory locations in which data reflecting communications are stored. The access controls may be held in place until the data in the memory location has been processed by a receiving entity.

By doing so, communication loss due to, for example, overwriting of data reflection communications may be reduced and/or the likelihood of communications being snooped (e.g., via reads by third parties) may also be reduced. Thus, embodiments disclosed herein may provide an improved method of communicating in memory mapped communication systems that may be more resilient and less likely to be infiltrated.

In an aspect, a computer-implemented method for managing memory mapped communications between a host device and a management controller is disclosed. The method may include obtaining, from the host device, an access request for a memory location that is subject to automated access controls and used for the memory mapped communications, and the access request comprising data indicative of a communication to the management controller; making a determination that the memory location is not access restricted; based on the determination: processing the access request by storing the data in the memory location and applying an applicable access control to the memory location; and notifying the management controller of the data in the memory location to prompt the management controller to process the data to receive the communication from the host device.

The applicable access control may be selected based on a type of the access request.

The applicable access control may lock the memory location for read access and write access.

The computer-implemented method may also include, prior to the management controller processing the data in the memory location: obtaining, from the host device, a second access request for the memory location, and the second access request comprising second data indicative of a second communication to the management controller; making a second determination that the memory location is subject to the applicable access control; based on the second determination: rejecting the second access request.

The computer-implemented method may additionally include after the management controller processes the data in the memory location: obtaining, from the host device, a third access request for the memory location, and the third access request comprising third data indicative of a third communication to the management controller; making a third determination that the memory location not subject to the applicable access control; based on the third determination: processing the third access request by storing the third data in the memory location and applying the applicable access control to the memory location; and notifying the management controller of the third data in the memory location to prompt the management controller to process the third data to receive a third communication from the host device.

The automated access controls may specify types of access controls that are to be applied to the memory location based on a type of the access request.

The applicable access control may not be modifiable by the host device.

The applicable access control may be modifiable by the management controller.

The host device may be operably connected to the management controller via an enhanced serial peripheral interface bus.

The access request may further include a header indicating a type of the access request, an indicator of a completion status of the access request, and an identifier of the memory location.

The access request may be obtained by a memory mapped communication system including a memory comprising the memory location; and a memory manager that applies the applicable access control to the memory location.

The memory mapped communication system may be part of the management controller and manages communications from the host device via the enhanced serial peripheral interface bus.

In an embodiment, a non-transitory media is provided. The non-transitory media may include instructions that when executed by a processor cause the computer-implemented method to be performed.

In an embodiment, a data processing system (e.g., part of a host device) is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide any quantity and type of computer implemented services. To provide computer implemented services, the system of FIG. 1 may include a host device 100, any number of hosted entities 102 that may provide the computer implemented services, management controller 106 that may facilitate management of host device 100 through modifying its operation and/or performing other functions, memory mapped communication system 104 for mediating communications between hosted entities 102 and management controller 106, and communication bus 110 over which communications between hosted entities 102 and management controller 106 may be transmitted. Each of these components is discussed below.

Hosted entities 102 may be implemented with any number of hardware and/or software components that may provide all, or a portion, of the computer implemented services. The capacity for hosted entities 102 to provide computer implemented services may depend on the operation of host device 100. To cooperatively manage the operation of host device 100, hosted entities 102 may communication with management controller 106 (e.g., to indicate operational preferences, provide information, receive information regarding the operation/future operation of host device 100, etc.) via memory mapped communication system 104.

Management controller 106 may be implemented with one or more hardware components and/or software components. The hardware components and/or software components may operate as a computing device independent from host device 100, and operably connected (e.g., for communication purposes) to hosted entities 102 via memory mapped communication system 104.

Management controller 106 may manage the operation of host device 100 by, for example, (i) modifying the configuration/functionality of hardware components and/or software components of host device 100, (ii) sending and/or receiving control information from other entities (e.g., such as a deployment manager that may orchestrate the operation of any number of host devices), and/or (iii) performing other management functions. To facilitate the functionality of hosted entities 102, management controller 106 may manage the operation of host device 100, at least in part, in cooperation with hosted entities 102. To cooperate with hosted entities 102, management controller 106 may send information to and/or receive information from hosted entities 102 via memory mapped communication system 104.

Memory mapped communication system 104 may be implemented with one or more hardware components and/or software components that facilitate memory mapped communications between hosted entities 102 and management controller 106. Memory mapped communications may be a communication scheme in which communications are facilitated by writing data representative of communications to a memory location accessible by multiple entities. A first entity may write data to the memory location and a second entity may read the data from the memory location thereby completing an information transmission between the entities. However, if the data stored in the memory location is modified prior to the second entity reading the data from the memory location, then the second entity may not receive the communication and/or may interpret the modified data as the communication.

In general, embodiments disclosed herein relate to methods, systems, and devices for managing memory mapped communications between host devices, or entities thereof, and hosted management controller to reduce the likelihood of miscommunication and/or reduce overhead for such communications. To manage memory mapped communications, memory mapped communication system 104 may take automatic action following accesses to memory locations used for memory mapped communications to reduce the likelihood of communications being missed. To do so, memory mapped communication system 104 may identify a type of an access request for a memory location used for memory mapped communications. The type of the access request may trigger deployment of any number and type of access controls for the memory location. The access controls for the memory location may reduce the likelihood of miscommunications occurring during memory mapped communications.

For example, consider a scenario where two applications (e.g., types of hosted entities 102) would like to communication with management controller 106. To do so, a first of the applications may store data in a memory location. However, due to limitations on the operation of management controller 106 and/or other components, management controller 106 may not be able to access the data stored in the memory location prior to the second application storing different data in the memory location in its separate attempt to communicate with management controller 106. If the different data is stored (e.g., overwrites) in the memory location, management controller 106 may not be able to access the data from the first application thereby preventing management controller 106 from receiving the communication from the first application and/or potentially misbelieving that the different data from the second application is representative of the communication from the first application.

To reduce the likelihood of (or prevent) such scenarios from occurring, memory mapped communication system 104 may automatically apply access controls when memory locations used for memory mapped communications are accessed. Memory mapped communication system 104 may identify the types of access, determine applicable access controls based on the identified types of the access, and automatically apply the access controls. The access controls may include, for example, (i) read only, (ii) write only, (iii) no access (e.g., read or write), and (iv) full access (e.g., read and write). The access controls may be applied with respect to certain entities (e.g., hosted entities and/or management controllers), or generally applicable.

When an access control is applied to a memory location, an entity that is to interact with the data in the memory location may be notified. For example, when a hosted entity stores data (e.g., representative of a communication to a management controller) in a memory location used for memory mapped communications, the memory location may be locked against access by other hosted entities and a management controller may be notified of the data in the memory location. However, the management controller may not need to take immediate action because the data in the memory location is not subject to becoming unavailable by virtue of the access controls that were automatically put in place.

Figure 2A:
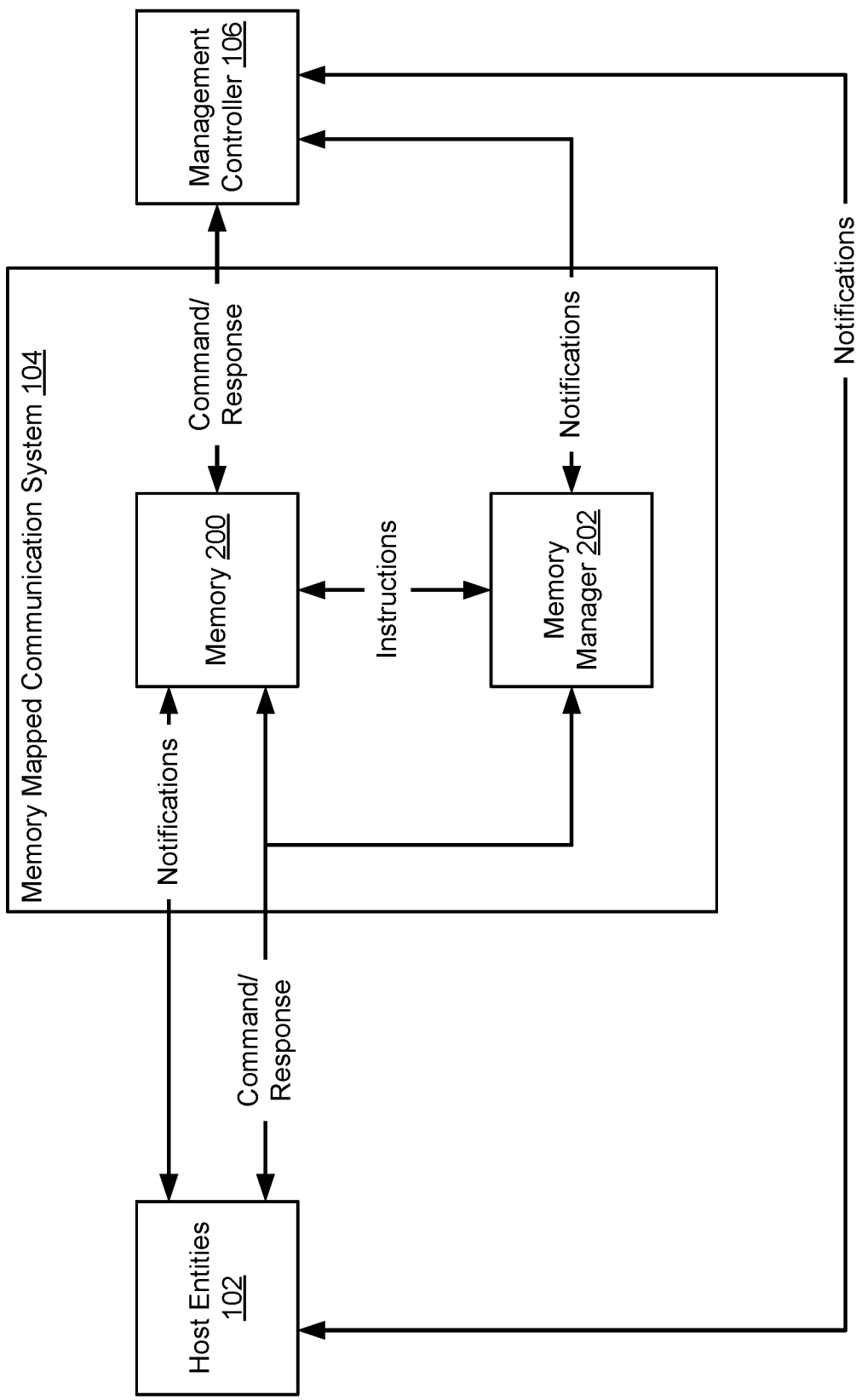
FIG. 2A shows a block diagram illustrating a memory mapped communication system accordance with an embodiment.
Figure 2B:
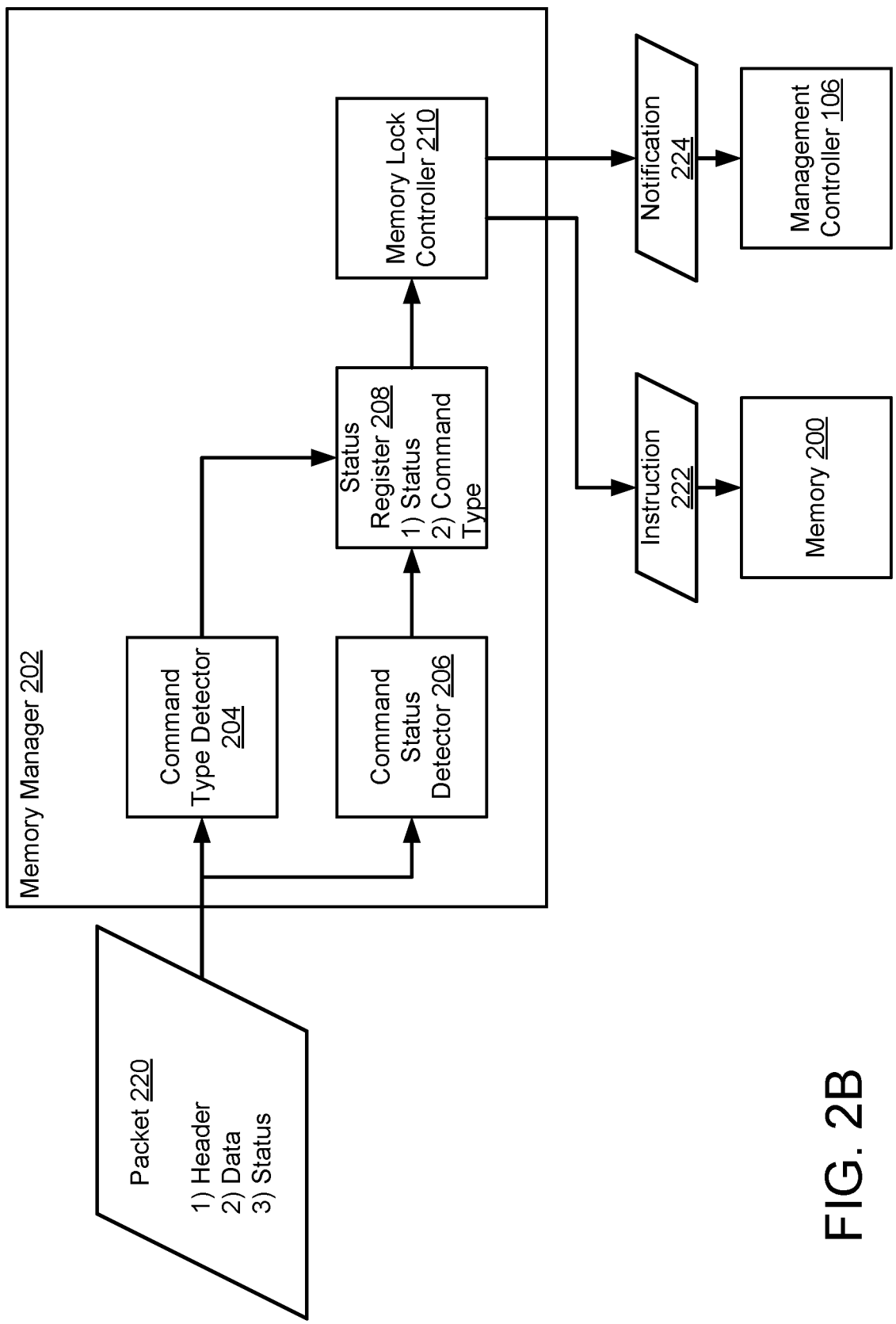
FIG. 2B shows a block diagram illustrating a memory manager in accordance with an embodiment.
Figure 2C:
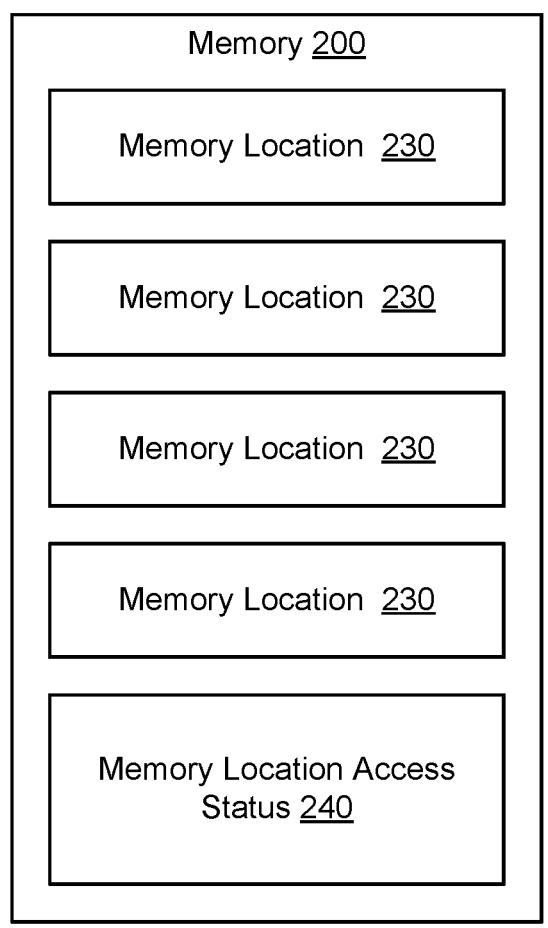
FIG. 2C shows a block diagram illustrating a memory in accordance with an embodiment.

When an access request is received by memory mapped communication system 104, the memory location impacted by the access request may be reviewed for access controls. If access controls for the memory location are in place, then the access request may be denied thereby preserving data that may be representative of a communication and not yet read in place for future action. Refer to FIGS. 2A-2C for additional details regarding memory mapped communication system 104.

Communication bus 110 may facilitate communications between hosted entities 102, memory mapped communication system 104, and/or management controller 106. For example, communication bus may be implemented with an enhanced serial peripheral interface (ESPI) bus that may allow for data to be attempted to be stored in memory of memory mapped communication system 104 and/or read from the memory. The ESPI bus may also support, for example, interrupt communications between management controller 106, hosted entities 102, and/or other components of host device 100 (and/or other devices).

Host device 100 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of data processing device or system. For additional details regarding computing devices, refer to FIG. 5.

The system of FIG. 1 may include any number and types of host devices 100. Any of the aforementioned devices may operate independently and/or cooperatively to provide computer implemented services. Host devices 100 may provide such services to, for example, user of host devices 100, to other host devices, and/or to other devices not shown in FIG.

While illustrated in FIG. 1 as included a limited number of specific components, a system in accordance with an embodiment may include fewer, additional, and/or different components than those illustrated therein.

Turning to FIG. 2A, a diagram of memory mapped communication system 104 in accordance with an embodiment is shown. As discussed above, memory mapped communication system (MMCS) 104 may manage memory mapped communications between management controller 106 and host entities 102. To manage the communications, MMCS 104 may include memory 200 and memory manager 202. Each of these components is discussed below.

Memory 200 may be implemented with any type of memory device. Generally, memory 200 may include some shared memory locations (and/or other memory locations that are not shared) which are accessible by host entities 102 and management controller 106. To facilitate communications with these shared memory locations, host entities 102 may generate and second specially formed data packets to memory 200. The specially formed data packets may be access requests for various memory locations of memory 200. The access request may be, for example, read and/or write requests. The data stored in the memory location may represent a communication.

Memory 200 may include functionality to control access to any of its memory locations. The access controls may be upon any basis including, for example, a type of the access (e.g., read access, write access), an entity initiating/attempting the access (e.g., only the host entities may be restricted from readying/writing while management controller 106 may be able to read/write certain locations while access controls are in place). The access controls may be set by memory manager 202 and/or other entities. For example, memory manager 202 may determine access controls for the shared memory locations and cooperate with memory 200 to enforce the access controls. For example, memory manager 202 may set flags, provide information, and/or perform other actions to put in place access controls. The access controls may be dynamically changed over time.

In an embodiment, memory manager 202 and management controller 106 are able to modify access controls enforced by memory 200 while host entities 102 (and/or other components) are not able to modify the access controls for the shared memory locations.

When data, representing a communication, is stored in memory 200, various notifications may be sent between management controller 106, host entities 102, memory 200, and memory manager 202 for notification purposes. For example, an entity to which the communication is directed may receive a notification.

When host entities 102 stored data in shared memory locations of memory 200 to communicate with management controller 106, memory manager 202 may notify management controller 106 of the presence of the stored data in the shared memory location. Similarly, when management controller 106 stores data in a shared memory location of memory 200 to communicate with a host entity, management controller 106 may notify the host entity directly (e.g., via a direct communication path as illustrated by the line terminating in double arrows between these components) or indirectly through memory 200. For example, when data is stored by management controller 106 in a shared memory location, memory 200 may notify the host entity of the data. These notifications may cause the receiving components to read the data immediately or at a later point in time (e.g., depending on the workload of the component).

To facilitate automatic application of access controls when data is stored in memory 200 by a host entity, the data packet in which the data is sent to memory 200 may be reviewed by memory manager 202. Memory manager 202 may automatically apply an access control to a shared memory location if warranted. Refer to FIGS. 2B-2D for additional details regarding memory 200 and memory manager 202.

Turning to FIG. 2B, a diagram of memory manager 202 in accordance with an embodiment as shown. As discussed above, memory manager may automatically modify access controls for memory locations of memory 200 and may also send notification to management controller 106 when data is stored in a shared memory location used for memory mapped communications. To provide its functionality, memory manager 202 may receive packets (e.g., 220) from an entity attempting to communicate with management controller 106 through memory mapped communications. Memory manager 202 may process received packets to determine whether any access controls should be automatically put in place. To automatically put in place access controls for memory locations, memory manager 202 may include a command type detector 204, a command status detector 206, a status register 208, and/or a memory lock controller 210. Each of these components is discussed below.

Command type detector 204 and command status detector 206 may extract information from packets usable to ascertain whether an access control should be established. Command type detector 204 may identify a type of command (e.g., a type of data access request such as a read, write, etc.) included in the packet. For example, a packet may include a header, data, status, and/or other portions. The header may include information indicating the type of the access request being communicated with packet 220 to memory 200.

Command status detector 206 may identify the status of performance of the command being communicated with the packet. The status may be identified by reading a portion of the status information included in packet 220.

Status register 208 may store information obtained by command type detector 204 and command status detector.

Memory lock controller 210 may use the information obtained by the detectors (e.g., 204, 206) and/or other information to ascertain whether an access control should be enforced on a memory location. For example, memory lock controller 210 may use a lookup table that is keyed to the information obtained by the detectors. A lookup may return an access control to be applied to a memory segment, or an indication that no access control is to be applied.

The lookup table may be dynamically modified by the management controller or other entities to modify the types of access controls that are automatically applied when certain types of access requests are encountered.

When access controls are to be put in place, memory lock controller 210 may generate and send instructions (e.g., 222) to memory 200. The instructions may indicate whether the memory location is to be subject to an access control. Memory 200 may automatically apply access controls.

When data is stored in a shared memory location, memory lock controller 210 may also send a notification (e.g., 224) to management controller 106 to notify it of the stored data. Notification may indicate, for example, the memory location in which data from a packet (220) has been stored.

In an embodiment, one or more of command type detector 204, command status detector 206, status register 208, and memory lock controller 210 is implemented using a hardware device including circuitry. The hardware device may be, for example, a digital signal processor, a field programmable gate array, or an application specific integrated circuit. The circuitry may be adapted to cause the hardware device to perform the functionality of command type detector 204, command status detector 206, status register 208, and/or memory lock controller 210. command type detector 204, command status detector 206, status register 208, and/or memory lock controller 210 may be implemented using other types of hardware devices without departing embodiment disclosed herein.

In one embodiment, one or more of command type detector 204, command status detector 206, status register 208, and memory lock controller 210 is implemented using a processor adapted to execute computing code stored on a persistent storage that when executed by the processor performs the functionality of command type detector 204, command status detector 206, status register 208, and/or memory lock controller 210 discussed throughout this application. The processor may be a hardware processor including circuitry such as, for example, a central processing unit, a processing core, or a microcontroller. The processor may be other types of hardware devices for processing information without departing embodiment disclosed herein.

While illustrated in FIG. 2B with a limited number of specific components, a memory manager may include additional, fewer, and/or different components without departing from embodiments disclosed herein.

Turning to FIG. 2C, a diagram of memory 200 in accordance with an embodiment is shown. Memory 200 may include any number of memory locations (e.g., 230). A memory location may be an address portion of memory 200 in which data may be stored and/or read.

Any of memory locations may be used for memory mapped communications. When so used, as noted above, access controls may be automatically put into place.

To implement the access controls, memory 200 may include memory location access status 240. When access controls for various memory locations are received, memory location access status 240 may be updated to reflect the added/remove/modified access controls. When access requests are received, the memory location addressed by the access location may be compared to memory location access status 240 to determine if any access controls apply. If any access controls apply, memory 200 may automatically respond by rejecting the access request (e.g., if the access request is incompatible with the access control, such as a write attempt for a memory location when the memory location is subject to a write locked access control), or implementing the access request depending on the access control corresponding to the memory location impacted by the access request.

Figure 3A:
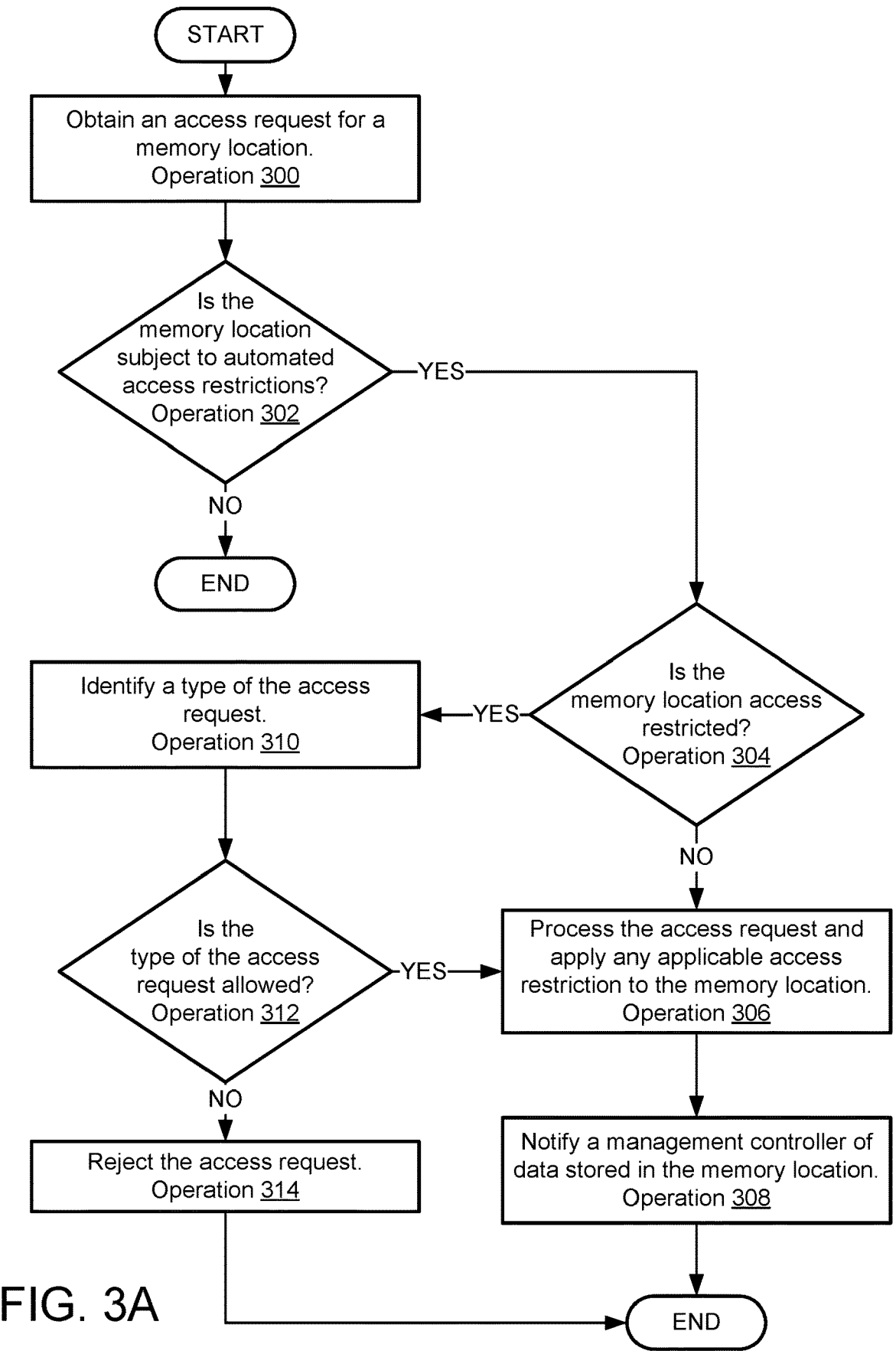
FIG. 3A shows a flow diagram illustrating a method of processing an access request for memory mapped communications in accordance with an embodiment.
Figure 3B:
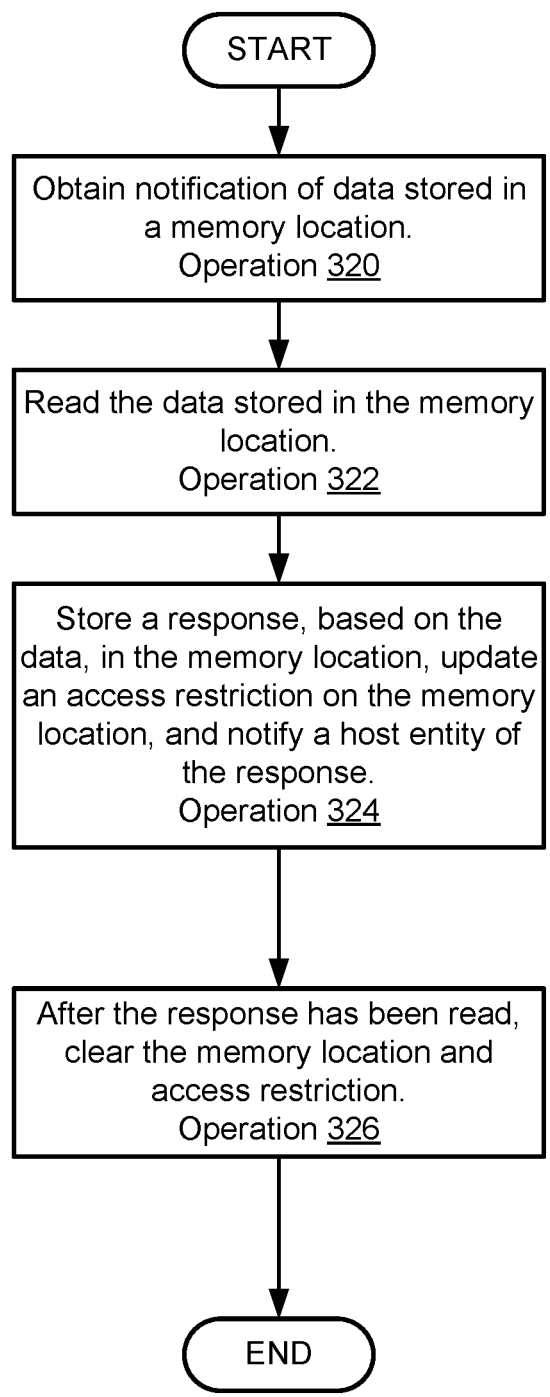
FIG. 3B shows a flow diagram illustrating a method of processing a notification regarding data stored as part of memory mapped communications in accordance with an embodiment.

As discussed above, the components of FIG. 1 may perform various methods to increase the likelihood of host devices being able to communicate with management controllers through memory mapped communications. FIGS. 3A-3B illustrate examples of methods that may be performed by the components of FIG. 1. In the diagrams discussed below and shown in these figures, any of the operations may be repeated, performed in different orders, skipped, and/or performed in a parallel with or a partially overlapping in time manner with other operations.

Turning to FIG. 3A, a flow diagram illustrating a method of processing an access request in accordance with an embodiment is shown.

Prior to operation 300, any number (e.g., none, one, many) of access controls for one or more memory locations used for memory mapped communications may be put in place.

At operation 300, an access request for a memory location is obtained. The access request may be obtained by receiving it. For example, a host entity may send the access request. The access request may impact a shared memory location (e.g., shared with a management controller).

At operation 302, it is determined whether the memory location is subject to automated access controls. The determination may be made, for example, by determining whether the memory location impacted by the access request is used for memory mapped communications. If the memory location is used for memory mapped communications, then it may be determined that the memory location is subject to automated access controls.

If the memory location is subject to automated access controls, then the method may proceed to operation 304. If the memory is not subject to automated access controls, then the method may end following operation 304.

At operation 304, it is determined whether the memory location is access restricted. The determination may be made by comparing the memory location to the memory location access status of a memory. For example, the memory location access status may associate memory locations with access controls if any are implemented for the respective memory locations. A lookup based on the memory location associated with the access request may be performed to identify if any access controls apply. If any access controls apply, then it may be determined that the memory control is access restricted.

If the memory location is access restricted the method may proceed to operation 310. If the memory location is not access restricted, then the method may proceed to operation 306.

At operation 306, the access request is applied and any applicable access controls are applied to the memory location. The access request may be processed by storing the data from the access request (e.g., from the packet) in the memory location. The access controls may be applied by (i) identifying the access controls to be applied based on a type of the access control and (ii) updating the memory location access status 240 to reflect the identified access controls. To identify the access controls, a lookup may be performed in a data structure (e.g., rules) that associates access controls with one or more of (i) access request types, (ii) requestor identities, and/or (iii) memory locations (e.g., range(s)). The aforementioned information may be extracted/deduced from a packet thereby allow for a lookup of access controls for the memory location to be performed.

At operation 308, a management controller is notified of the data stored in the memory location. The management controller may be notified by sending an interrupt to the management controller.

The method may end following operation 308.

Returning to operation 304, the method may proceed to operation 310 if the memory location is access restricted.

At operation 310, a type of the access request is identified. The type of the access request may be identified using headers or other data included in a packet.

At operation 312, it is determined whether the type of the access is allowed. The determination may be made by identifying the access controls being enforced on the memory location and comparing them to the type of the access request to identify whether they are incompatible (e.g., a write when the memory location is write locked). If the access control is incompatible with the type of the access request, then it may be determined that the access request is not allowed.

If it is determined that the type of the access request is allowed, then the method may proceed to operation 306. Otherwise the method may proceed to operation 314 following operation 312.

At operation 314, the access request is rejected. The access request may be rejected, for example, by discarding the access request. For example, if the access request is a storage request, the data requested to be stored in the memory location may be discarded and not stored. An entity that sent the access request may be notified of the rejection (e.g., via an interrupt communication or other mechanism).

The method may end following operation 314.

Using the method illustrated in FIG. 3A, access controls may automatically be applied to memory locations thereby reducing the likely of data reflecting communications from becoming unavailable prior to the data being read by an intended recipient.

Turning to FIG. 3B, a flow diagram illustrating a method of processing a notification of data being stored in accordance with an embodiment is shown.

At operation 320, a notification of data stored in a memory location is obtained. The notification may be obtained by receiving an interrupt from a memory management controller.

At operation 322, the data stored in the memory location is read. The data may reflect a communication from another entity that is being transmitted to the management controller via a memory mapped communication. The memory location may be subject to access controls that prevent the content of the data from being modified by entities other than the management controller.

At operation 324, a response, based on the data, is stored in the memory location. An access control on the memory location may also be updated. The access control may be updated to allow a host entity that stored the data in the memory location to read the response from the memory location. For example, the management controller may modify the memory location access status to reflect that the memory location may be read by the host entity (the memory location may have previously been both read and write locked to the host device). The host entity (e.g., that stored the data) may also be notified of the response stored in the memory location. The host entity may be notified by sending an interrupt after the response is stored in the memory location.

At operation 326, after the response has been read (e.g., by the host entity that stored the data), the memory location may be cleared and the access control may be cleared. The memory location may be cleared by deleting the data or storing a default pattern in the memory location. The access control may be cleared by removing any access controls specified for the memory location.

The method may end following operation 326.

Using the method illustrated in FIG. 3B, communications between management controllers and host devices may be secured or made less susceptible to losing communications (e.g., to undesired memory access).

Figure 4A:
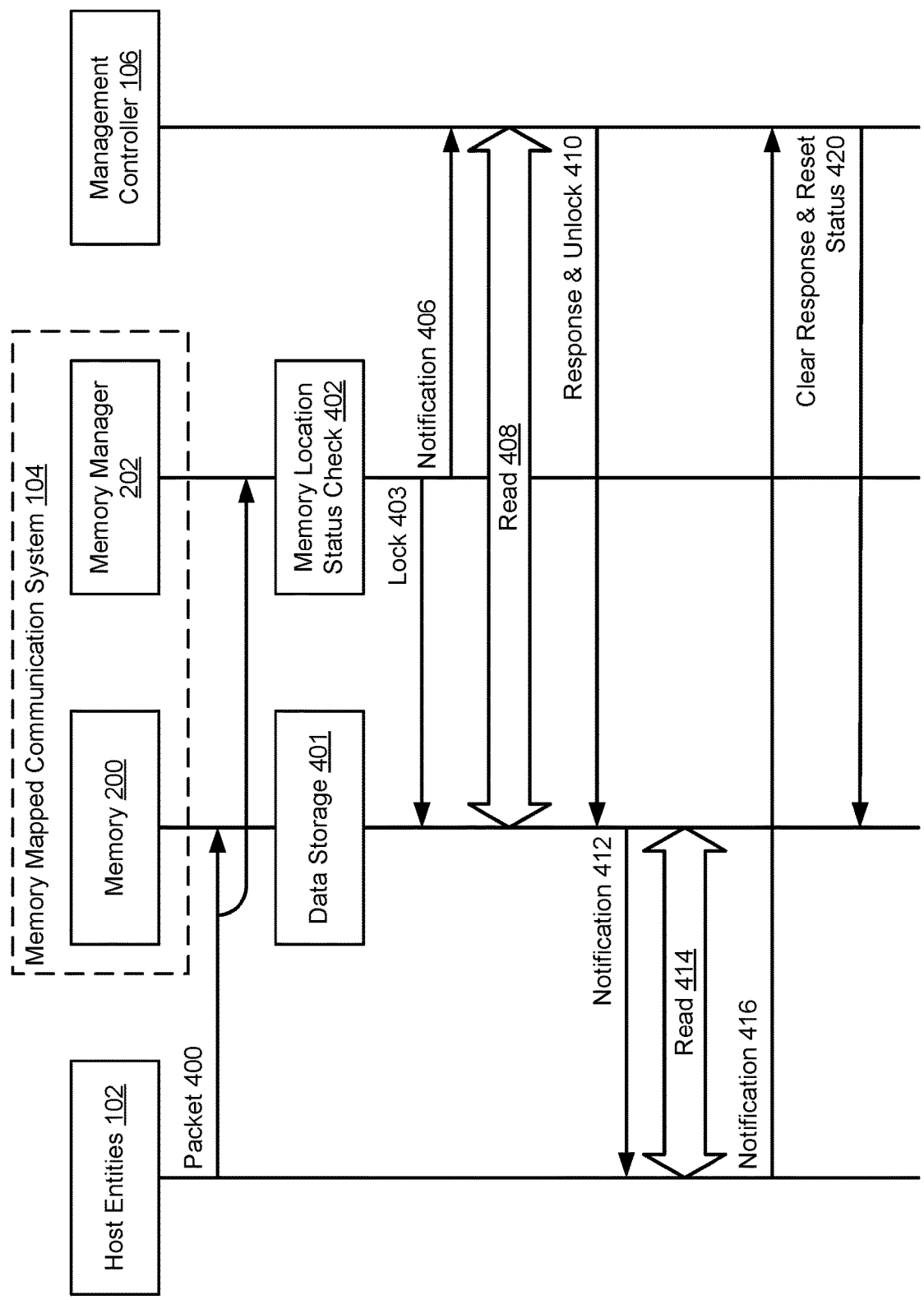
FIGS. 4A-4C show diagrams illustrating actions performed by and/or interactions between components of a system in accordance with an embodiment.
Figure 4B:
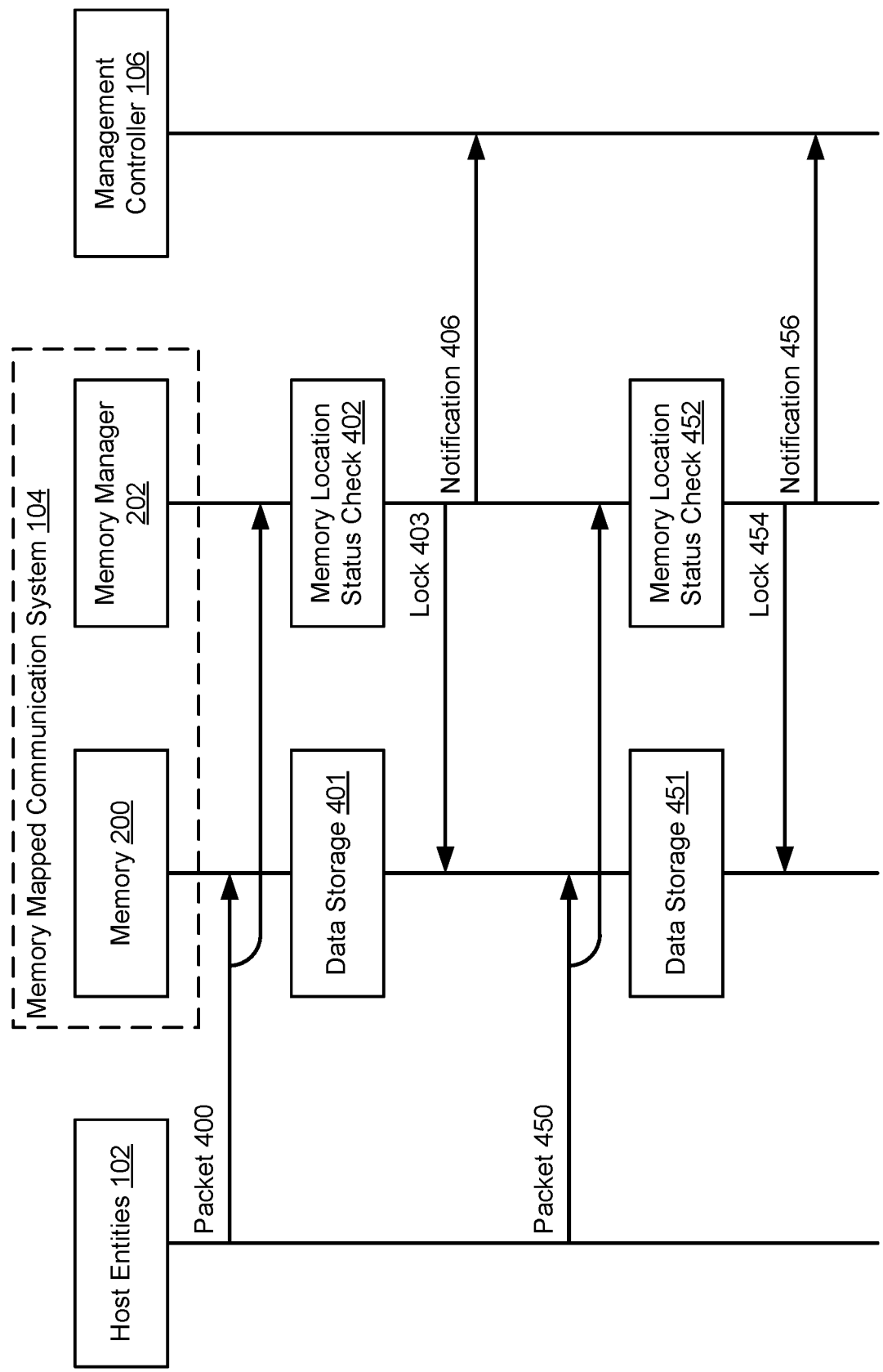
Figure 4C:
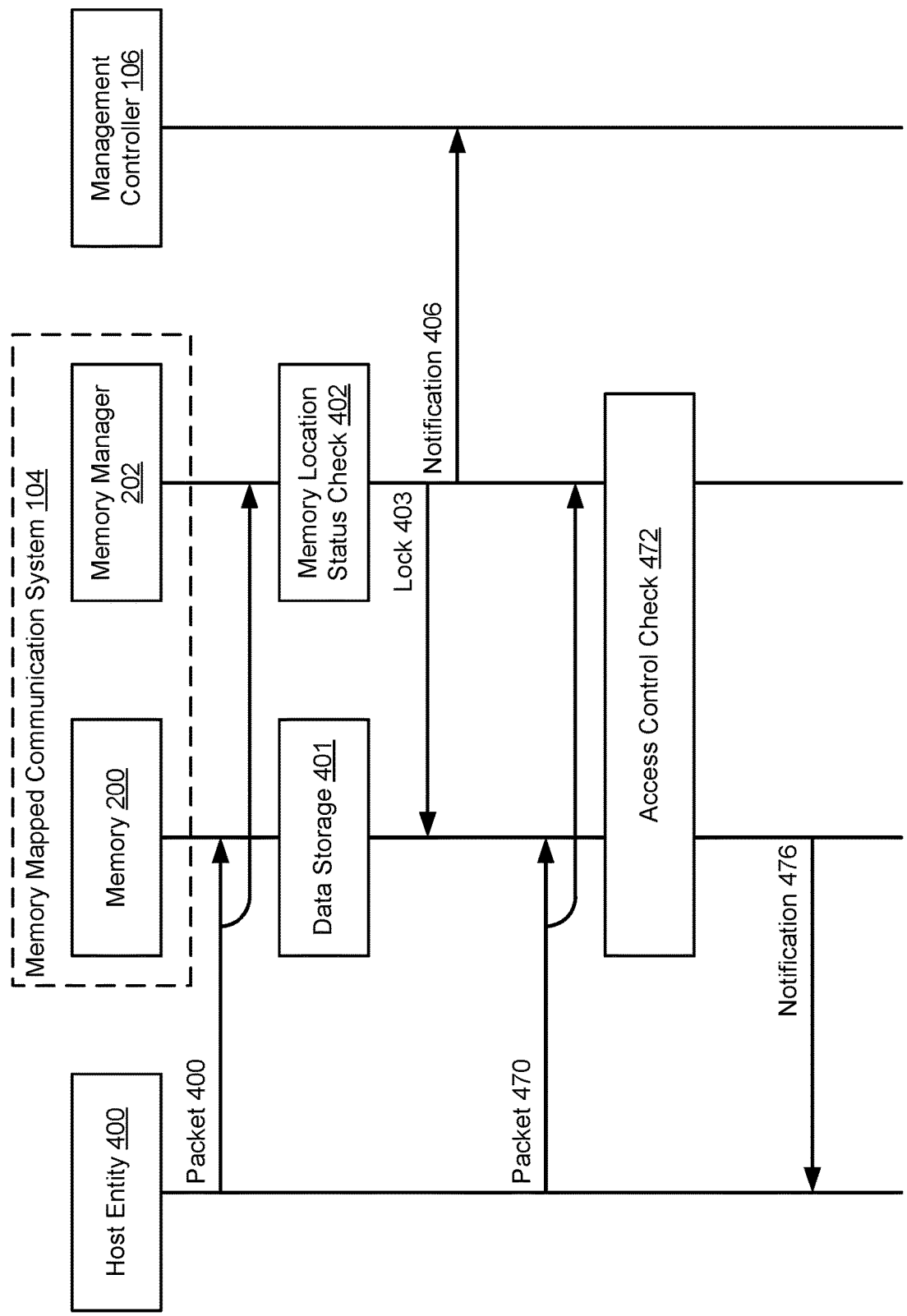

As discussed above, by managing memory mapped communications, host entities and a management controller may be more likely to successfully communication with each other. FIGS. 4A-4C illustrate actions that may be performed by components of the system of FIG. 1 to manage memory mapped communications. In these figures, actions performed by various components and interactions between components (e.g., data transmissions) are shown. The actions performed by the respective components are shown with boxes in alignment with the line descending from the box representing the respective component of the system. Interactions between components are illustrated with arrows interconnecting the lines descending from the boxes. Generally, the actions and interactions are ordered as may be performed in a temporal order with earlier actions/interactions being towards the top of the page and later performed actions/interactions being towards the bottom of the page. The actions/interactions may be performed in other orders.

Turning to FIG. 4A, consider a scenario in which host entities 102 includes an application that communicates with management controller 106. For example, the application may request a change in the operation of the host device hosting the application. To communicate, the application may generate and send packet 400 to memory 200. The packet may indicate that data reflecting the request is to be stored in a first memory location.

When the packet is received by memory mapped communication system, memory manager 202 to may perform a memory location status check 402 to determine whether any access controls may apply. In this scenario, memory manager 202 has been instructed to lock shared memory locations for both reading and writing. The memory location status check 402 indicates that the memory location in which the data reflecting the request is stored is to be locked. Accordingly, after the data is stored in the memory location, a lock 403 is performed for the memory location by updating the memory location access status 240 for memory 200 to indicate that the first memory location is locked (e.g., both read and write locked) with respect to host entities 102. By doing so, the now-stored data may not be made unavailable via rewriting or deletion and snooping of the data may be prevented by also limiting read access. A notification 406 may also be sent to management controller 106.

Because management controller 106 is not otherwise occupied, it immediately performs a read 408 of the first memory location. In this scenario, management controller 106 decides not to implement the request and generates a response indicating that the request will not be met. To notify the application that the request will not be met, management controller 106 sends the response and an unlock 410 to memory 200. Memory 200 may store the response in the memory location and unlock the memory location at least for reading. Memory 200 may also send notification 412 to the application so that the application is aware of the presence of the response.

The application may then perform read 414 to receive the response to the request, thereby completing the bidirectional memory mapped communication. To let the management controller 106 know that the response has been received, the application may send notification 416 to management controller 106. In response, the management controller 106 may clear the response and reset the status 420 of the first memory location.

Turning to FIG. 4B, now consider a second scenario in which the same series of actions occurred through notification 406. However, unlike in the scenario in FIG. 4A, in FIG. 4B management controller 106 may be otherwise occupied and may not be able to immediately read the first memory location.

During this time, a second application may also wish to communicate with management controller 106 via memory mapped communications to request a second modification to the operation of the host device. However, unlike the first application, the second application may do so by storing information regarding the requested modification in a second memory location.

Accordingly, the memory location status check 452 performed by memory manager 202 indicates that the second memory location should also be locked, and a corresponding lock 454 and notification 456 for the data stored in the second memory location are sent to memory 200 and management controller 106, respectively, after the data is stored in the second memory location.

Turning to FIG. 4C, now consider a third scenario in which the same series of actions depicted in FIG. 4A occurs through notification 406. However, unlike in the scenario in FIG. 4A, in FIG. 4B management controller 106 may be otherwise occupied and may not be able to immediately read the first memory location.

During this time, a second application may also wish to communicate with management controller 106 via memory mapped communications to request a second modification to the operation of the host device. Just like the first application, the second application may do so by storing information regarding the requested modification in the memory location.

However, at this point, because the first memory location is both read and write locked, it may not be possible for the data to be stored. Accordingly, when packet 470 that includes the data representing the requested modification is sent to memory 200 for storage, and an access control check 472 is performed, it is determined that the data from packet 470 may not be written to the first memory location because it is locked. Accordingly, the data is discarded and notification 476 may be sent to the second application indicating that the data has not been written.

In contrast, as seen in FIGS. 4A and 4B, when data is written to the first or second memory locations and access controls are not in place, data storages (e.g., 401, 451) may be performed thereby storing the data from the corresponding packets in the first or second memory locations, respectively.

Figure 5:
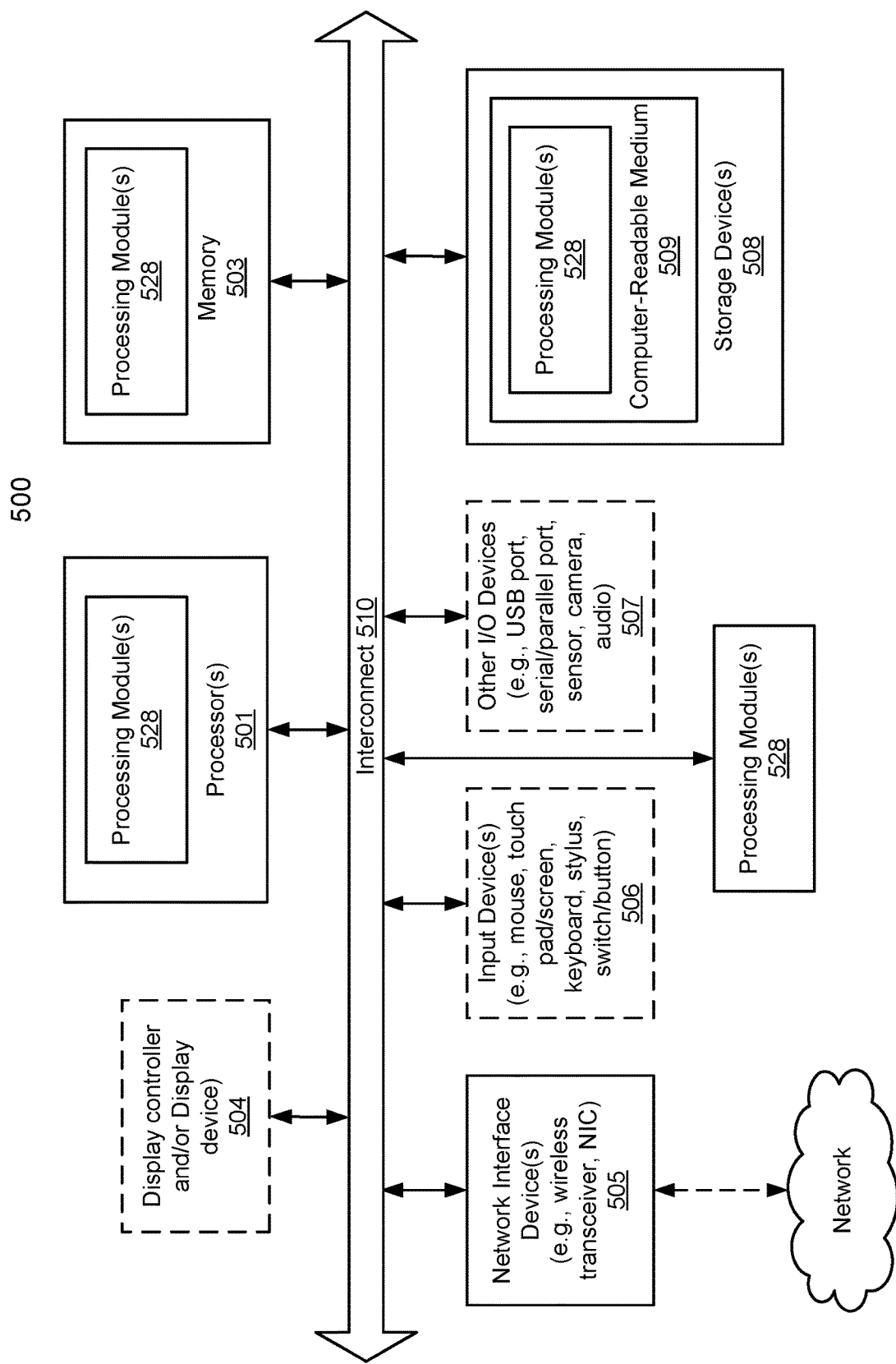
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing memory mapped communications between a host device and a management controller, the method comprising:

obtaining, from the host device, a first access request to access a memory location, wherein automated access controls are being applied to the memory location and the memory location is used for the memory mapped communications between the host device and the management controller, and wherein the first access request includes first data associated with a first message from the host device to the management controller;

making a determination, after receiving the first access request, that the memory location is not access restricted;

based on the determination that the memory location is not restricted:

processing the first access request by storing the first data in the memory location and applying an applicable access control to the memory location; and notifying the management controller of the first data stored in the memory location after the first access request is processed to prompt the management controller to process the first data to receive the first message from the host device.

2. The computer-implemented method of claim 1, wherein the applicable access control is selected based on a type of the first access request.

3. The computer-implemented method of claim 2, wherein the applicable access control causes the memory location to lock read access and write access to the memory location.

4. The computer-implemented method of claim 3, further comprising:

before the management controller has processed the first data in the memory location to retrieve the first message and after the applicable access control has been applied after the first data is stored in the memory location:

obtaining, from the host device, a second access request to access the memory location, and the second access request includes second data associated with a second message from the host device to the management controller;

making a second determination, after receiving the second access request, that the applicable access control applied to the memory location after the first data is stored in the memory location is still currently being applied to the memory location;

based on the second determination:

rejecting the second access request to access the memory location.

5. The computer-implemented method of claim 4, further comprising:

after the management controller processes the first data in the memory location and retrieves the first message:

obtaining, from the host device, a third access request to access the memory location, and the third access request includes third data associated with a third message from the host device to the management controller;

making a third determination, after receiving the third access request, that the applicable access control applied to the memory location after the first data is stored in the memory location is no longer being applied to the memory location;

based on the third determination:

processing the third access request by storing the third data in the memory location and applying a new applicable access control to the memory location; and notifying the management controller of the third data stored in the memory location after the third access request is processed to prompt the management controller to process the third data to receive the third message from the host device.

6. The computer-implemented method of claim 1, wherein the automated access controls being applied to the memory location specify types of access controls that are to be applied to the memory location based on a type of the first access request.

7. The computer-implemented method of claim 1, wherein the applicable access control is not modifiable by the host device.

8. The computer-implemented method of claim 7, wherein the applicable access control is modifiable by the management controller.

9. The computer-implemented method of claim 1, wherein the host device is operably connected to the management controller via an enhanced serial peripheral interface bus.

10. The computer-implemented method of claim 9, wherein the first access request further comprises a header indicating a type of the first access request, an indicator of a completion status of the first access request, and an identifier of the memory location.

11. The computer-implemented method of claim 10, wherein the first access request is obtained by a memory mapped communication system comprising:

a memory comprising the memory location; and a memory manager that applies the applicable access control to the memory location.

12. The computer-implemented method of claim 11, wherein the memory mapped communication system is part of the management controller and manages messages sent from the host device via the enhanced serial peripheral interface bus.

13. A system, comprising:

a host device;

a management controller; and memory mapped communication system comprising:

a memory comprising a memory location; and a memory manager adapted to:

obtain, from the host device, a first access request to access the memory location, wherein automated access controls are being applied to the memory location and the memory location is used for memory mapped communications between the host device and the management controller, and wherein the first access request includes first data associated with a first message from the host device to the management controller;

make a determination, after receiving the first access request, that the memory location is not access restricted;

based on the determination:

process the first access request by storing the first data in the memory location and apply an applicable access control to the memory location; and notify the management controller of the first data stored in the memory location after the first access request is processed to prompt the management controller to process the first data to receive the first message from the host device.

14. The system of claim 13, wherein the applicable access control is selected based on a type of the first access request.

15. The system of claim 14, wherein the applicable access control causes the memory location to lock read access and write access to the memory location.

16. The system of claim 15, wherein the memory manager is further adapted to:

before the management controller has processed the first data in the memory location to retrieve the first message and after the applicable access control has been applied after the first data is stored in the memory location:

obtaining, from the host device, a second access request to access the memory location, and the second access request includes second data associated with a second message from the host device to the management controller;

making a second determination, after receiving the second access request, that the applicable access control applied to the memory location after the first data is stored in the memory location is still currently being applied to the memory location;

based on the second determination:

rejecting the second access request to access the memory location.

17. A non-transitory machine-readable medium having instructions stored therein, which when executed by a processor, cause the processor to perform operations for managing memory mapped communications between a host device and a management controller, the operations comprising:

obtaining, from the host device, a first access request to access a memory location, wherein automated access controls are being applied to the memory location and the memory location is used for the memory mapped communications between the host device and the management controller, and wherein the first access request includes first data associated with a first message from the host device to the management controller;

making a determination, after receiving the first access request, that the memory location is not access restricted;

based on the determination that the memory location is no restricted:

processing the first access request by storing the first data in the memory location and applying an applicable access control to the memory location; and notifying the management controller of the first data stored in the memory location after the first access request is processed to prompt the management controller to process the first data to receive the first message from the host device.

18. The non-transitory machine-readable medium of claim 17, wherein the applicable access control is selected based on a type of the first access request.

19. The non-transitory machine-readable medium of claim 18, wherein the applicable access control causes the memory location to lock read access and write access to the memory location.

20. The non-transitory machine-readable medium of claim 19, wherein the operations further comprise:

before the management controller has processed the first data in the memory location to retrieve the first message and after the applicable access control has been applied after the first data is stored in the memory location:

obtaining, from the host device, a second access request to access the memory location, and the second access request includes second data associated with a second message from the host device to the management controller;

making a second determination, after receiving the second access request, that the applicable access control applied to the memory location after the first data is stored in the memory location is still currently being applied to the memory location;

based on the second determination:

rejecting the second access request to access the memory location.

\* \* \* \* \*